Feb. 28, 1967     F. MATEJCEK ETAL     3,306,966
PROCESS FOR PREPARING COMPACT EXPANDABLE URETHANE FOAMS
Filed April 8, 1963
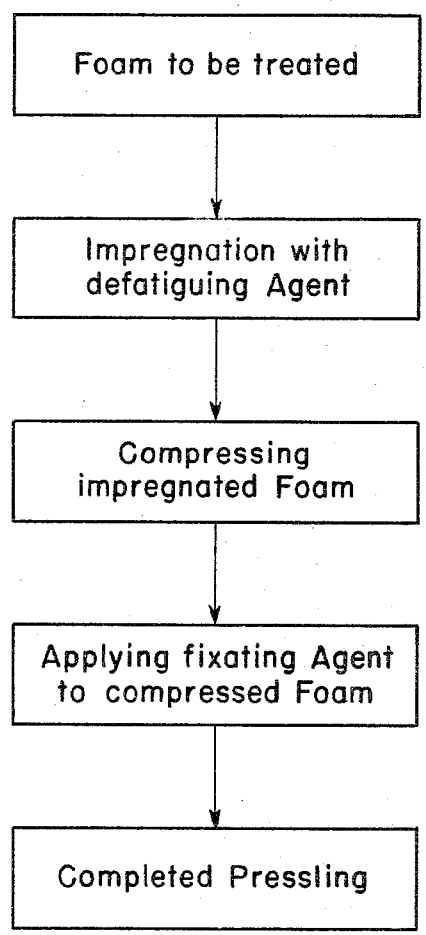
INVENTORS
Franz Matejcek
Kurt Sponsel
Helmut Pietsch
Curt Walter Leupold
BY Lowell H. McCarter
ATTORNEY

United States Patent Office 3,306,966
Patented Feb. 28, 1967

3,306,966
PROCESS FOR PREPARING COMPACT
EXPANDABLE URETHANE FOAMS
Franz Matejcek, Pirkheimerstrasse 11, Nurnberg, Germany; Kurt Sponsel, Mauerstrasse 51, Dusseldorf, Germany; Helmut Pietsch, Elbingerstrasse 66, Nurnberg, Germany; and Curt Walter Leupold, Schiifstrasse 10, Nurnberg, Germany
Filed Apr. 8, 1963, Ser. No. 271,483
2 Claims. (Cl. 264—321)

This invention relates to the manufacture of compact foamed materials which in the proper environment are highly expandable. More particularly, the invention relates to the manufacture of compressed polyurethane foams which when brought in contact with liquids expand and are highly absorbent.

After the foaming operation, commercial urethane foam materials are conventionally cut into blocks and stored to await further processing. The additional processing usually comprises cutting the foam blocks into the final form in which they are later to be marketed. Thus, the final processing steps are mainly characterized by cutting operations to shape the foam for marketing.

Because polyurethane foam is extremely bulky, a storage problem is presented. One possible solution would be to store and transport the foam in a compressed state. However, urethane foam materials normally "fatigue" upon prolonged compression with a resulting permanent compression or deformation of the foam materials. Thus, compression of the foam is usually avoided during storage or transportation.

It is an object of this invention to manufacture polyurethane foams which can be stored in a compressed state without incurring permanent deformation. Another object is to manufacture compressed polyurethane foams which upon contact with a liquid expand and are highly absorbent. Still another object is to provide a method of treating polyurethane foams whereby such foams can be stored for long periods of time in a compressed state and which compressed foams upon contact with liquid expand to their original proportions. These and other objects are accomplished by this invention which is described hereinafter.

According to this invention, hydrophilic urethane foam compositions as described, for example, in our co-pending application Serial No. 271,484, now abandoned, filed of even date herewith, are impregnated with a small amount of a defatiguing agent to be described below and subsequently compressed. In this pressed state the foam materials are then fixated in such a manner that the fixation is permanent during storage in the air, but upon contact with liquids, especially water, the original shape of the compressed article can be reconstituted. Thus, as soon as the compressed, fixated foam comes in contact with water, the fixation disappears and the foamed body expands to a multiple of its volume in the compressed state. Due to the expansion, the foam body develops a much greater absorbency than is present in the foam material which has not been so pretreated. In the following description, the compressed and fixed foam will be referred to, for short, as "pressling."

The drawing is a flow diagram outlining the succession of steps employed in the practice of this invention.

Impregnation of the urethane foam material with the above referred to defatiguing agent serves the purpose of preventing "fatiguing" of the foamed body in the compressed state. While some compressed polyurethane foams without being impregnated will retain their compact form, certain disadvantages are associated with such materials. For example, a prolonged compression of a non-impregnated foam specimen for approximately 4 to 8 days in a vise is sufficient to obtain a pressling which will retain its compressed shape for a prolonged period. Such a foam made from hydrophilic material may also expand very rapidly as it is brought in contact with water. However, after prolonged storage the time needed for expansion upon contact with water becomes increasingly longer. Another disadvantage is that upon expansion such materials will not regain their full volume which they originally possessed in the native state. Furthermore, compressed foams without suitable impregnation are subject to fatigue and have only limited storage stability.

Various substances can be applied with success to prevent fatiguing of the foam specimen in the compressed state. Materials that have been proved to be effective with hydrophilic urethane foams include ethylene glycol, polyethylene glycol, water-soluble derivatives of ethylene oxide and water-soluble carbohydrates such as sugar, lactose, sorbitol, glycerine, citric acid, polyacrylic acid, lactic acid, etc. A preferred material is polyethylene glyol having a molecular weight of about 300.

The treatment contemplated by this invention, namely, the compressing of impregnated urethane foam materials to a small volume and fixation in this state, which fixation disappears later in the presence of liquids and allows the foam to re-expand, enables the use of urethane foam materials in a large number of new applications and affords great advantages.

As an example of this procedure the manufacture of tampons is described in the following.

Specimens of 3 x 3 x 30 cm. are cut from an open-celled, hydrophilic foam with a specific weight of approximately 0.035 and impregnated with a 5% aqueous solution of polyethylene glycol of approximate molecular weight 300. After removing the excess solution by compression, the specimens are dried. After such treatment, aproximately 15 to 20% of the polyethylene glycol, based on dry foam weight, remains in the foam samples. The specimens are then individually clamped at one end and twisted longitudinally. As a result of this procedure, the volume of the foam strand decreases from 9 cm.$^3$ per 1 cm. strand length to approximately 0.6 cm.$^3$ per 1 cm. strand length. The free end of the foam strand is then also clamped. The foam strand is then painted with a 2% aqueous solution of methyl cellulose on all sides. After the first coat has dried, the specimen is again painted with the same solution and allowed to dry. After the second coat has dried, the foam strands can be removed from their clamps. They retain their shape over months and undergo no change during storage in air. The fixed strands of foam are then cut into pieces of about 5 cm. length. Thus handy tampons are obtained.

Such a tampon of 5 cm. length with a volume of approximately 3 cm.$^3$ is dropped into water. Within 11 to 25 seconds the specimen expands to a volume of approximately 4 x 4 x 6 cm.³, i.e. 96 cm.³. Thus within a few seconds the tampon has expanded to 32 times its original volume and during the expansion has become saturated with water. Even after storage for 2 months, the time needed for expansion of such a tampon in cold water does not change.

The advantages of such a procedure are evident. First, the tampon obtains a certain stability and solidity from the pressing operation, which makes it possible to introduce such a specimen into openings.

Second, the foam material acquires through this treatment an absorbency which it normally does not possess.

Third, the tampon develops its absorbing properties exactly at that time when it comes in contact with fluids, i.e. exactly at the time when its absorbing properties are needed.

Fourth, the tampon expands to a multiple of its original volume and, given suitable pore structure, absorbs this volume of fluid.

The procedure which has been described in the manufacture of tampons can be varied in many ways. However, all these variations have in common a densification of the foam material with simultaneous or subsequent fixation in the dense state. Such pressings are stable and can be stored in this form for long durations. Upon contact with a liquid, the fixating agent is dissolved and the desired effect is obtained through the expansion of the foam material.

The pressing, or compressing, operation can be varied out in various ways. As described above in the example, the foam specimen may be twisted to a strand and densified in this manner. Other possibilities shall be exemplified using a foam cube of 3 x 3 x 3 cm. Such a cube can be compressed normal to one of its outside surfaces. Thus a flat pressings of about 3 x 3 x 0.15 cm. is obtained which later on will only expand in the same direction as it was originally compressed. In the case of a compression in two directions which are normal to each other, a rod-like pressing of approximately 3 x 0.7 x 0.7 cm. is obtained which later on will expand in two directions. This method of compressing a specimen is especially suitable for the preparation of slender tampons.

Finally, the foam-cube of 3 x 3 x 3 cm. can be compressed in three directions to a small cube of approximately 1.2 cm. edge-length. This cube expands in water in all three directions. Thus, the direction of expansion of the pressings can be predetermined by the method of compressing.

In order to obtain the benefits contemplated by this invention, the foam is usually compressed in at least one direction by an amount so as to reduce the volume of the foam to from about 0.5 to 0.005 of its original volume.

The compressed foam is fixated by application of a methyl cellulose solution from the outside and subsequent drying. In place of methyl cellulose other fixing agents can also be used, for example high molecular weight polyethylene glycol with a molecular weight of about 1,000,000 and larger.

It is not necessary that the fixing agent be applied externally in every case. It can also be introduced in combination with the impregnating agent in the original impregnating step prior to compression. The foam is then compressed and fixation occurs simultaneously.

The compressing surfaces can also be heated so that fixation can be obtained with the aid of fixing agents which, at elevated temperature melt or liquify and solidify upon cooling. Alternatively, a heated, melted fixing agent can be applied that solidifies on contact with the foam surface. Fixing agents are chosen whose melting points are below the temperature at which noticeable changes of the foam material itself occur. Also, spinning, wrapping or sewing of the densified foam with soluble threads, strands or foils is possible.

Whatever agent is used for the fixation depends naturally on the ultimate application. In any event, the fixing agent must be soluble in the medium which later on is to be absorbed. In many applications contemplated by this invention, the dissolving liquid media will be of an aqueous base.

From foam specimens with the dimensions of approximately 18 x 6 x 2 cm., flat pressings of approximately 18 x 6 x 0.15 cm. can be prepared. These flat pressings can be used as unobtrusive, sanitary napkins of excellent absorbency. An additional advantage of these flat sanitary napkins is their small volume, which makes it possible to package them in small containers, thereby markedly decreasing their transportation volume. Upon contact with aqueous based fluids, these flat napkins expand exactly at the point where the fluid makes contact and immediately absorb the fluid.

Presslings which have been compressed in all three directions are useful as novelty articles and toys. For example, a fish or crocodile is cut from a hydrophilic foam, impregnated, compressed to a small ball and fixated. Upon dropping of this ball into a bathtub filled with water, the ball will expand to a fish, crocodile or the like.

Out of hydrophilic foam material, which is impregnated with sugar, a frog or similar animal is cut, compressed to a small cube and fixated. This small cube is camouflaged in conventional manner in a sugar cube. Upon dissolution of such a sugar cube a frog will appear which will fill up the whole cup. Analogously, decorative flowers for aquariums can be prepared from urethane foams and offered in the form of presslings.

By placing an appropriately shaped pressling in a coffee cup it is possible to prevent the spilling of coffee on ships on high seas or in airplanes. Many other uses for the compressed forms of this invention will be obvious to those skilled in the art.

In order to achieve improved fixation, swelling agents can be incorporated into these presslings, which thicken the penetrated liquid in such a manner that it will not exude from the foam pores. Other ancillary materials may be included in the foams of this invention. Thus, coloring agents, surface-active substances, deodorizing agents, pigments, scents and other fillers or auxiliary agents may be utilized to obtain specifically desired properties.

While the above details apply to hydrophilic foam materials as described, for example, in our previously referred to co-pending application, it is not restricted thereto. The same principle can also be applied in the case of substantially hydrophobic urethane foam materials which have been prepared, for example, from polyester alcohols or water-insoluble polyalkylene glycols. However, the impregnating agents used to prevent fatiguing of hydrophilic urethane foam are ineffective when applied to hydrophobic urethane foam materials. However, with these latter foams, such substances as chloroparaffins, nitroparaffins and polypropylene glycols as well as other water-insoluble co-polymerizates of propylene oxide and ethylene oxide are effective against fatiguing.

We claim:

1. Process for preparing compact, expandable polyurethane foams which comprises impregnating said foam with a defatiguing agent, compressing the thus impregnated foam, applying a fixating agent to said compressed foam whereby the foam retains its compressed form until said foam is brought into contact with a liquid which is capable of dissolving said fixating agent.

2. Process for preparing compact, expandable polyurethane foam which comprises impregnating a hydrophilic polyurethane foam with a solution of a defatiguing agent selected from the group consisting of ethylene glycol and water-soluble derivatives of ethylene oxide, compressing the thus impregnated foam to at least one-half of its original volume, coating the thus compressed foam with a solution of a fixating agent selected from the group consisting of polyethylene glycol having a molecular weight of at least 1,000,000 and methyl cellulose, and allowing said solution to dry whereby said foam retains its compact form until brought in contact with a liquid capable of dissolving said fixating agent.

References Cited by the Examiner

UNITED STATES PATENTS

| | | | |
|---|---|---|---|
| 2,666,954 | 1/1954 | Potter | 264—321 XR |
| 3,000,464 | 9/1961 | Watters | 264—321 XR |
| 3,189,669 | 6/1965 | Goldfein | 264—321 XR |
| 3,193,598 | 7/1965 | Schafer | 264—321 XR |

ALEXANDER H. BRODMERKEL, *Primary Examiner.*

P. E. ANDERSON, *Assistant Examiner.*